United States Patent [19]

Videen

[11] 4,097,638

[45] Jun. 27, 1978

[54] SELECTIVELY SORPTIVE REINFORCED SHEET

[75] Inventor: Otis R. Videen, St. Paul, Minn.

[73] Assignee: Conwed Corporation, St. Paul, Minn.

[21] Appl. No.: 752,528

[22] Filed: Dec. 20, 1976

[51] Int. Cl.² ............................................. B01D 39/18
[52] U.S. Cl. ...................................... 428/213; 210/483;
 210/502; 210/504; 428/287; 428/290; 428/302;
 428/303; 428/910
[58] Field of Search ................ 210/30 A, 36, 40, 502,
 210/504, 505, DIG. 26, 483, 506–508; 428/248,
 249, 255, 910, 287, 213, 290, 302, 303

[56] References Cited

U.S. PATENT DOCUMENTS

| | | | |
|---|---|---|---|
| 3,464,920 | 9/1969 | Pirson et al. | 210/36 |
| 3,617,552 | 11/1971 | Will et al. | 210/DIG. 26 |
| 3,630,891 | 12/1971 | Peterson et al. | 210/DIG. 26 |
| 3,647,061 | 3/1972 | Kaupin | 428/249 |
| 3,739,913 | 6/1973 | Bogosian | 210/DIG. 26 |
| 3,764,016 | 10/1973 | Sewell et al. | 210/DIG. 26 |
| 3,764,527 | 10/1973 | Sohl | 210/DIG. 26 |
| 3,770,575 | 11/1973 | Ball | 210/DIG. 26 |
| 3,995,087 | 11/1976 | Desanzo | 428/910 |

Primary Examiner—Charles N. Hart
Assistant Examiner—Ivars Cintins
Attorney, Agent, or Firm—Eyre, Mann, Lucas & Just

[57] ABSTRACT

A reinforced sheet product for selective sorption of an immiscible liquid from a liquid mixture is disclosed. The reinforced sheet product comprises a flexible net-like reinforcing structure secured between at least two sheets or layers of non-woven material predominately composed of cotton which are preferentially sorptive of one liquid over another liquid in the mixture. The product according to the invention finds particular application as a lightweight reinforced wiping cloth or towel especially useful for removing oil from an aqueous mixture.

6 Claims, No Drawings

SELECTIVELY SORPTIVE REINFORCED SHEET

The present invention relates to a product for the removal of a first immiscible liquid from a liquid mixture and more particularly to a reinforced sheet which is preferentially sorptive of one liquid over another liquid in the mixture. The reinforced sheet of the present invention is especially suited to wiping oil to remove it from an aqueous mixture without being wetted out by the water.

The present invention is embodied in and carried out by a reinforced sheet product which is operative to selectively sorb one liquid from a liquid mixture. According to the invention, the reinforced sheet comprises at least two sheets or layers of non-woven predominately cotton material which are preferentially sorptive of one liquid over another liquid in the mixture, and a flexible net-like reinforcing structure secured therebetween. Advantageously, the non-woven sheets or layers and the net-like structure are thin, lightweight and flexible whereby the reinforced sheet may be used as a wiping cloth or towel to wipe and remove the said liquid from the mixture. By way of illustration and not limitation, the reinforced sheet of the invention finds particular application in wiping hydrocarbons from aqueous mixtures thereof. Typical hydrocarbon liquids immiscible with water include gasolines, kerosenes, light oils, heavy oils, jet fuel, petroleum, asphalt and paraffin crudes, diesel oil, naphtha, water immiscible ketones, aromatic solvents such as benzene, toluene and xylene, terpenes, esters, phenols, aldehydes, amides, amines, mercaptans, fatty acids, fatty acid esters, halohydrocarbons, polar organic compounds, and the like and these compounds will hereinafter be represented by oil. Reinforced sheets according to the invention when used to sorb oil comprise a non-woven predominately cotton material sized with at least one oleophillic, hydrophobic agent and thereafter formed into sheets which are secured to the net-like reinforcement or which are formed as layers on and secured to the net-like reinforcement. Oleophillic, hydrophobic agents include, for example, waxes, asphalts, rosin and resin derivatives, fatty acid anhydrides, dimer sizes, tall oil derivatives and the like. Preferred sizing materials are disclosed in U.S. Pat. Nos. 2,754,206 and 3,770,575. The non-woven material may also comprise polymeric fibers which are preferentially sorptive of oil over water. Such fibers are disclosed, for example, in U.S. Pat. Nos. 3,518,183, and 3,147,216. Alternatively, the surfaces of the reinforced sheet may be treated or sized after the reinforced sheet or non-woven sheets have been formed, by spraying the surface thereof with hydrophobic agents including silanes, quaternary ammonium compounds having long chain hydrocarbon groups attached to nitrogen atoms that are oleophillic, and the like. The non-woven material according to the present invention is a felted fabric formed from cotton and admixtures which are predominately cotton and one such is sold under the trademark Tufflex and comprises a felted fibrous mat of cotton and rayon acetate. The cotton fibers of the felted mat of the present invention will generally have a length of from about ⅜ inch to about one inch. They have a minimum average length of at least about ½ inch and preferably at least about ⅝ inch. The long length of the fibers is beneficial not only in aiding sorption but also in terms of decreased dusting and otherwise breaking apart of the felted mat. It is preferred that the cotton fibers make up 90 to 100% of the felted material, and most preferably rayon acetate or viscose rayon makes up the balance.

The reinforcing net-like structures of the present invention are thermoplastic and are preferably flat thermoplastic nets with strands which are integrally extruded at the joints. Flat net-like structures are preferred because there are no raised joints which may interfere with the securing of the net-like structure and the sorbent material. Processes suitable for making these nets are taught for example according to U.S. Pat. Nos. 3,252,181 and 3,384,692 wherein a plurality of parallel longitudinal strands are extruded and a plurality of parallel transverse strands are integrally extruded therewith normal to the longitudinal strands at spaced intervals. It is necessary in accordance with the present invention that the thermoplastic reinforcing net be oriented after it is extruded. By orienting it is meant that the reinforcing net is heated and stretched to at least 5 times its original dimension at a temperature above its second glass transition temperature whereby the net takes a permanent stretch. Orienting the net increases the size and tensile strength while correspondingly reducing weight. Apparatuses and methods for orienting net-like materials are well known in the art and are shown for example in British Patent Nos. 1,235,901 and 905,252. In the preferred form of the present invention, there are two sets of parallel strands which are extruded integrally with each other. However, it will be appreciated that the reinforcing nets according to the present invention could comprise more than two sets of strands.

In accordance with the preferred embodiment of the invention extruded and then oriented polyolefin square pattern net, of polypropylene, having a strand count of from about 2 to about 4 per square inch in each direction, preferably about 3 in each direction per square inch and having a weight of from about ½ to about 3 pounds per thousand square feet (lbs/MSF), preferably from about ¾ to about 2 lbs/MSF, is employed as the reinforcing structure. Fibrous material predominately of cotton having a minimum average length of at least about ½ inch is formed into a felt having a thickness of from about 1/64 to about ⅛ inch, preferably from about 1/32 to about 1/16 inch and a density of from about 2 to about 10 pounds per cubic foot, preferably from about 3 to about 6 pounds per cubic foot. The fiber sheets are laminated to sandwich the net therebetween in known manner, for example using suitable adhesives such as starch, polyvinyl acetate, protein, polymeric latexes, resin solvent adhesives, or the like. The laminate product is cut into suitable size sheets. Typically, a laminate sheet will be 12 by 12 inches for use as a wiping cloth. The laminate sheets according to the present invention are quite flexible, light weight and strong. In using the sheets as wiping cloths or towels to sorb oil, they may be flexed, and squeezed or wrung and reused a number of times and are especially suited to applications requiring a wiping cloth or towel with good strength and sorption qualities.

While reference has been made to a wiping cloth, it is to be understood that other applications of the reinforced sheet according to the present invention are intended to be covered by the claims herein.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing the spirit and scope of the invention.

What is claimed is:

1. A wipe sheet for selectively sorbing at least one hydrocarbon liquid from an aqueous-hydrocarbon mixture, said wipe sheet comprising:
   (a) at least two cotton fiber layers, each said cotton fiber layer being non-woven and being predominately composed of cotton fibers together with a minor amount of polymeric fibers preferentially sorptive of hydrocarbon liquids over water, said cotton fibers having an average length of at least about one-half inch and having been sized with at least one oleophillic, hydrophobic agent, and each said cotton fiber layer being from about 1/64 inch to about ⅛ inch in thickness and having a density of from about 2 to 10 pounds per cubic foot;
   (b) a flexible net reinforcing layer, said reinforcing layer being composed of a polyolefin and having been biaxially oriented after extrusion to at least 5 times its extruded dimension and said reinforcing layer having a weight of from about ½ to about 3 pounds per thousand square feet;
   (c) said cotton fiber layers being affixed together with said reinforcing layer sandwiched therebetween.

2. The product of claim 1, wherein the oleophillic, hydrophobic agent is selected from the group consisting of waxes, asphalts, rosin and resin derivatives, fatty acid, anhydrides, dimer sizes, and tall oil derivatives.

3. The product of claim 1, wherein the surface of the said sheet is treated with an oleophillic, hydrophobic agent selected from the group consisting of silanes and quaternary ammonium compounds having long chain hydrocarbon groups attached to nitrogen atoms.

4. The product of claim 1, wherein the polyolefin is polypropylene.

5. The wipe sheet of claim 1 wherein the said two cotton fiber layers are at least 90% in cotton fibers.

6. The wipe sheet of claim 1 wherein the said two cotton fiber layers are affixed by adhesive.

* * * * *